United States Patent [19]

Bohn et al.

[11] Patent Number: 4,787,317

[45] Date of Patent: Nov. 29, 1988

[54] RAIL VEHICLE HAVING MAGNETIC MEANS FOR COMPENSATING FOR LOAD WEIGHT

[75] Inventors: Gerhard Bohn, Munich; Christian Gunther, Haar, both of Fed. Rep. of Germany

[73] Assignee: Messerschmitt-Bölkow-Blohm GmbH, Munich, Fed. Rep. of Germany

[21] Appl. No.: 106,157

[22] Filed: Oct. 8, 1987

[30] Foreign Application Priority Data

Nov. 6, 1986 [DE] Fed. Rep. of Germany ....... 3637844

[51] Int. Cl.$^4$ .................. B60L 13/04; B61B 13/08
[52] U.S. Cl. .................. 104/281; 104/286; 104/242; 105/164; 105/453
[58] Field of Search .................. 104/281–284, 104/286, 290–294, 242; 105/34.2, 73, 75, 77, 149, 164, 209, 453, 463.1

[56] References Cited

U.S. PATENT DOCUMENTS 1,081,260 12/1913 Zoelly .................. 104/284 X
3,641,939 2/1972 Remy .................. 104/293
4,142,469 3/1979 Polgreen .................. 104/283 X
4,212,249 7/1980 Kalina .................. 104/281
4,516,505 5/1985 Heidelberg .................. 104/284

FOREIGN PATENT DOCUMENTS 2043433 3/1972 Fed. Rep. of Germany ...... 104/281
2558104 6/1977 Fed. Rep. of Germany ...... 104/281
3236498 4/1984 Fed. Rep. of Germany ...... 104/281
0623769 9/1978 U.S.S.R. .................. 104/281

Primary Examiner—Robert B. Reeves
Assistant Examiner—Scott H. Werny
Attorney, Agent, or Firm—Kenyon & Kenyon

[57] ABSTRACT

A rail vehicle with spring support of its car body on an underframe with flanged wheels for guidance and support on a track. Permanent magnets are provided on the underframe, which exert an attraction counter to the wheel load on armature bars extending along the track. The magnetic force of the magnets is controllable as a function of the load (weight) of the car body by an increase or decrease of the magnetic resistance of a ferromagnetic magnet core by mechanical means as the load decreases or increases.

2 Claims, 1 Drawing Sheet

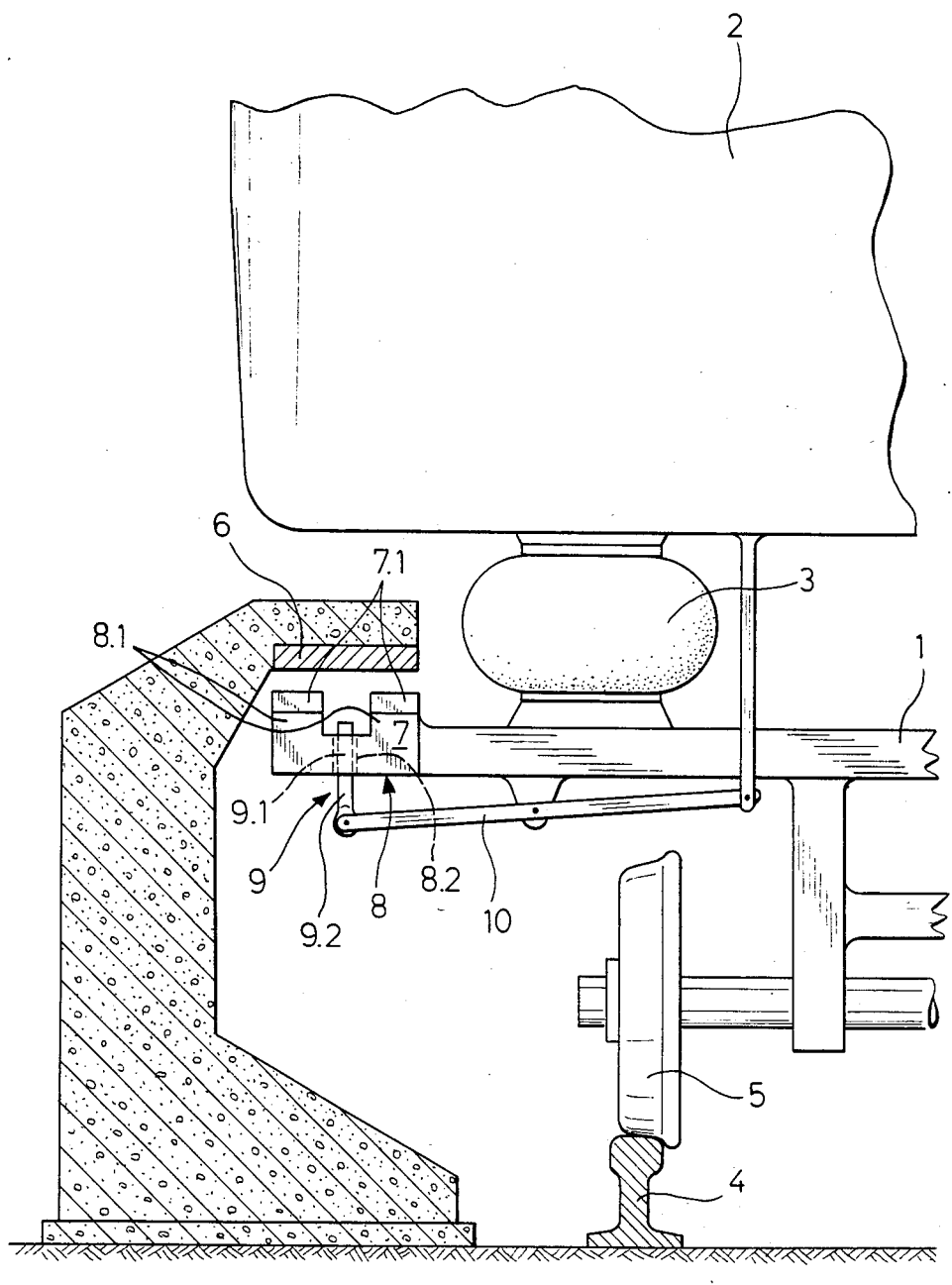

RAIL VEHICLE HAVING MAGNETIC MEANS FOR COMPENSATING FOR LOAD WEIGHT

BACKGROUND OF THE INVENTION

The present invention relates to a rail vehicle having conventional flanged wheels and having magnetic means for compensating for load weight.

In such a rail vehicle, known through DE-OS No. 1947980, having a linear induction motor, measures have been taken for the control of the motor thrust dependent on the load (weight), so that the armature of the induction motor together with the spring-supported vehicle loading platform is moved up or down depending on the loading operation, with the result of an increase or decrease of the air gap (opposite the inductor) and hence of the motor thrust.

Moreover, through DE-OS No. 3236498 it is known practice, in a track vehicle, to relieve the flange wheels by vehicle-side permanent magnets which in conjunction with a stationary long-stator linear motor are to exert a force lifting the flange wheels and thereby to carry the dead weight and the added load of the track vehicle. Here, however, the problem of load variations is solved only to the extent that the track vehicle, when empty, is secured by spacer rollers against lifting off the track.

SUMMARY OF THE INVENTION

It is, therefore, an object of the present invention in a rail vehicle of the initially mentioned kind to make possible even without such additional spacer rollers or wheels, by permanent magnets, a load relief of the flange wheels without danger of liftoff from the track.

The above and other objects of the invention are achieved by a rail vehicle with spring support of its car body on an underframe with flanged wheels for guidance and support in a track, comprising permanent magnets on the underframe which exert attraction, counter to the wheel load, on armature bars extending along the track with a magnetic force controllable as a function of the load of the car body by an increase or reduction of the magnetic resistance of a ferromagnetic magnet core by mechanical means as the load decreases or increases.

The invention utilizes the finding that a prerequisite for safety from lifting off of the flanged wheels is a variability of their load relief, and that to this end the permanent magnet offers a possibility of control (influence) by a configuration variable as a function of the car body level. Furthermore, coupling of the individual permanent magnet with the car body has the advantage of high operational reliability with simple structural means.

BRIEF DESCRIPTION OF THE DRAWING

The single FIGURE shows a transverse section of one side of a rail vehicle embodying the present invention.

DETAILED DESCRIPTION

In the following, the invention will be explained more specifically with reference to an embodiment. The drawing shows schematically, in transverse section only, one side of a rail vehicle in the region of its propulsion mechanism, on the underframe 1 of which a car body 2 is supported by, for example, an (air) spring system 3. The guiding of the rail vehicle along a track 4 occurs by means of flanged wheels 5 mounted to the underframe 1, for the relief of the wheels or for reducing the load at the point of wheel contact per flange wheel 5, a permanent magnet 7 is provided which exerts attraction on a ferromagnetic armature bar 6 extending along the track 4. The permanent magnet is laid out preferably for a certain load relief action or magnetic force, respectively, at full load (weight) of the car body 2. This requires the possibility of reducing the magnetic force in case of partial loading or emptying of the car body 2 to secure the permanent magnet 7 against striking against the associated armature bar 6 and thus to preclude the lifting off of the respective flange wheel 5 from track 4 (as a result of the magnetic force). For this purpose, measures have been taken that the magnetic force acting counter to the wheel load is controlled positively as a function of the load (weight) of the car body 2 by increase or decrease of the magnetic resistance of a ferromagnetic magnet core 8 by mechanical means as the load decreases or increases. To this end, the magnet core 8 which extends over the length of a vehicle side for all permanent magnets 7 is U-shaped and, for each permanent magnet 7, is provided at the pole faces of its two core legs 8.1 with permanent-magnetic pole plates 7.1. In addition, per permanent magnet 7, an armature 9 which for each permanent magnet 7 traverses the magnet core 8 between the two pole plates 7.1, is provided, which armature is longitudinally displaceable in the respective core hole 8.2 through the car body 2 in the direction of action of its spring system 3. The armature 9 consists of a nonmagnetic length section 9.1 and a ferromagnetic length section 9.2, each at least of the length of the core hole 8.2. By a rocking lever 10 pivotably coupled with the car body 2 in the direction of action of its spring system 3, this armature 9 is longitudinally displaced in such a way that with the car body 2 empty the core hole 8.2 is filled by the nonmagnetic length section 9.1 and hence the permanent magnet 7 exerts its smallest force on the armature bar 6, while with the car body 2 fully loaded the core hole 8.2 is filled by the ferromagnetic length section 9.2, with the result of maximum dynamic action of the permanent magnet 7. Naturally, depending on the state of load or level of the car body 2, the armature 9 can also occupy plunged positions in the magnet core 8, in which the ferromagnetic length section 9.2 partially bridges the core hole 8.2 magnetically, so that the magnetic flux of the permanent-magnetic pole plates 7.1 in the magnet core 8 increases as compared with the illustrated plunged position (immersion) with complete filling of the core hole 8.2 by the nonmagnetic length section 9.1 when the car body 2 is empty.

The above described principle of load-dependent control of the magnetic force by means of a mechanically variable magnetic resistance core hole 8.2 with partially nonmagnetic armature has the further advantage that despite the rigid arrangement of the permanent magnets 7 at the underframe 1 one can operate with a relatively narrow air gap opposite the armature bar 6, thus saving magnet weight. Naturally, such an armature bar extends on each side of track 4.

In the case of separate magnet cores 8 of the individual permanent magnets 7, it is possible also to choose an arrangement thereof in which the core legs 8.1 and pole plates 7.1 succeed each other in lengthwise direction of the vehicle and thus the permanent magnets 7 can at the same time form the armature of a synchronous long-stator motor.

In the foregoing specification, the invention has been described with reference to an exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A rail vehicle having a car body, an underframe, suspension means for the car body mounted on the underframe and flanged wheels for guiding and supporting the vehicle on a track, further comprising permanent magnet means attached to the underframe for exerting an attractive force, counter to the wheel load, on armature bar means extending along the track, the magnetic force exerted by the magnetic means being controllable as a function of the load of the car body by increase or reduction of the magnetic resistance of a ferromagnetic magnet core by mechanical means as the load decreases or increases, each permanent magnet means further comprising a U-shaped ferromagnetic magnet core with two core legs provided with pole faces, permanent-magnetic pole plates being attached at the ends thereof, the magnet core having a core hole traversed by an armature movable lengthwise in the direction of action of the spring support means, said armature comprising a nonmagnetic length section and a ferromagnetic length section, each at least having a length corresponding to the length of the associated core hole.

2. A rail vehicle having a car body, an underframe, suspension means for the car body mounted on the underframe and flanged wheels for guiding and supporting the vehicle on a track, further comprising permanent magnet means attached to the underframe for exerting an attractive force, counter to the wheel load, on armature bar means extending along the track, the magnetic force exerted by the magnet means being controllable as a function of the load of the car body by increase or reduction of the magnetic resistance of a ferromagnetic magnet core by mechanical means as the load decreases or increases, each permanent magnet being further comprised of a U-shaped ferromagnetic magnet core, its two core legs provided with pole faces, the pole faces having permanent-magnetic pole plates attached at the ends thereof, the magnet core having a core hole traversed by an armature movable lengthwise in the direction of action of the spring support means, said armature comprising a nonmagnetic length section and a ferromagnetic length section, each at least having a length corresponding to the length of the associated core hole, the armature further comprising a rocking lever pivotally coupled to the car body in the direction of action of the spring support means, the armature being longitudinally displaceable such that, with the car body empty, the core hole is filled by the nonmagnetic length section and with the car body fully loaded it is filled by the ferromagnetic length section.

* * * * *